United States Patent
Suzuki et al.

(10) Patent No.: US 12,394,125 B2
(45) Date of Patent: Aug. 19, 2025

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Yuzuru Suzuki, Kanagawa (JP); Yasunari Kishimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 327 days.

(21) Appl. No.: 17/865,782

(22) Filed: Jul. 15, 2022

(65) Prior Publication Data
US 2023/0177752 A1 Jun. 8, 2023

(30) Foreign Application Priority Data
Dec. 2, 2021 (JP) .................................. 2021-196278

(51) Int. Cl.
*G06T 11/60* (2006.01)
*G06T 7/11* (2017.01)
*G06T 7/12* (2017.01)
*G06T 13/80* (2011.01)

(52) U.S. Cl.
CPC .............. *G06T 11/60* (2013.01); *G06T 7/11* (2017.01); *G06T 7/12* (2017.01); *G06T 13/80* (2013.01); *G06T 2207/20081* (2013.01); *G06T 2207/20104* (2013.01); *G06T 2207/20212* (2013.01); *G06T 2210/32* (2013.01)

(58) Field of Classification Search
None
See application file for complete search history.

(56) References Cited

U.S. PATENT DOCUMENTS

| 5,715,331 | A * | 2/1998 | Hollinger ................. G06T 5/70 |
| | | | 382/199 |
| 7,508,547 | B2 | 3/2009 | Nishikawa et al. |
| 8,270,722 | B2 | 9/2012 | Ito et al. |
| 8,284,451 | B2 | 10/2012 | Misawa et al. |
| 2011/0175927 | A1 * | 7/2011 | Urashima ............... G06T 11/00 |
| | | | 345/619 |

(Continued)

FOREIGN PATENT DOCUMENTS

| JP | 3862694 B2 | 12/2006 |
| JP | 5153676 B2 | 2/2013 |
| JP | 5180670 B2 | 4/2013 |

*Primary Examiner* — Yi Wang
(74) *Attorney, Agent, or Firm* — Oliff PLC

(57) ABSTRACT

An information processing apparatus includes a processor configured to: segment a first image of an object contained in an image into a first area and a second area in accordance with a property of the first image of the object, the first area being to be represented in raster format, the second area being to be represented in vector format; convert an image of the second area into an image in the vector format if the first image of the object is represented in the raster format and convert an image of the first area into an image in the raster format if the first image of the object is represented in the vector format; and generate a second image of the object, the second image containing the image of the first area in the raster format and the image of the second area in the vector format.

12 Claims, 13 Drawing Sheets

(56) References Cited

U.S. PATENT DOCUMENTS

2014/0300630 A1\* 10/2014 Flider ................. G06T 11/60
　　　　　　　　　　　　　　　　　　　　　　345/626
2019/0007626 A1\* 1/2019 Kirsch ............... B60K 35/415
2022/0245877 A1\* 8/2022 Akimoto ............. G06F 40/56

\* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-196278 filed Dec. 2, 2021.

BACKGROUND

(i) Technical Field

The present disclosure relates to an information processing apparatus and a non-transitory computer readable medium.

(ii) Related Art

Although multiple image description formats are available in the related art, selection of an image description format to be used to represent an image has been made for each page containing components such as a photograph, a figure, an illustration, and a text or for each object contained in a page (for example, refer to Japanese Patent No. 5180670).

SUMMARY

However, since each image description format has its own advantages and disadvantages, an image of an object that benefits, for example, from both the advantage in expressing an image in raster format and the advantage in expressing an image in vector format cannot be generated, and it has been difficult to generate an image having an image quality intended by a user.

Aspects of non-limiting embodiments of the present disclosure relate to enabling generation of an image having an image quality closer to the image quality intended by the user than an image represented in a single image description format.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: segment a first image of an object contained in an image into a first area and a second area in accordance with a property of the first image of the object, the first area being to be represented in raster format, the second area being to be represented in vector format; convert an image of the second area into an image in the vector format if the first image of the object is represented in the raster format and convert an image of the first area into an image in the raster format if the first image of the object is represented in the vector format; and generate a second image of the object, the second image containing the image of the first area in the raster format and the image of the second area in the vector format.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail with reference to the attached drawings.

Configuration of Information Processing System

Figure 1:
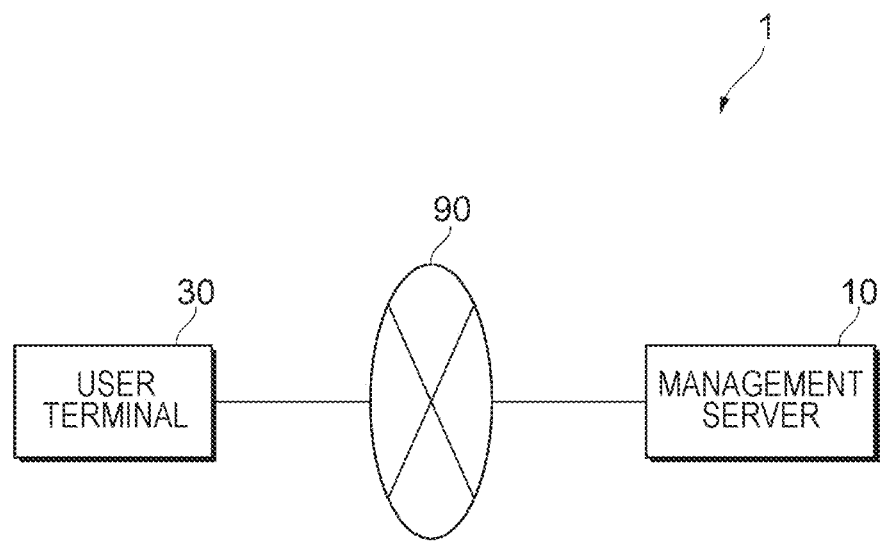
FIG. 1 is a diagram depicting an example of an overall configuration of an information processing system to which the present exemplary embodiment is applied.

FIG. 1 is a diagram depicting an example of an overall configuration of an information processing system 1 to which the present exemplary embodiment is applied.

The information processing system 1 has a configuration in which a management server 10 and a user terminal 30 are connected to each other by using a network 90. Examples of the network 90 include a local area network (LAN) and the Internet.

The management server 10 is an information processing apparatus as a server configured to manage the information processing system 1. For example, the management server 10 is configured to segment an image of an object contained in an image of an entire page into an area to be represented in raster format and an area to be represented in vector format in accordance with the property of the image of the object. In addition, of one or more images of objects contained in the image of the entire page, if the image of a target object for image processing is represented in raster format but includes an area to be represented in vector format, the management server 10 converts the image of the area into a representation in vector format. Further, if the image of a target object for image processing is represented in vector format but includes an area to be represented in raster format, the management server 10 converts the image of the area into a representation in raster format. Then, the management server 10 generates an image of the object including an area represented in raster format and an area represented in vector format. Detailed description of these procedures performed by the management server 10 will be given below. In the present specification, the term "image" also means "image data".

The term "raster format" refers to an image description format in which an image is represented by using pixels having different densities or pixels having different colors, and raster format is widely used to represent an image having complex shading, such as a photograph and a graphic. An image in raster format is saved in a file format such as BMP, JPEG, TIFF, GIF, or PNG. A representation in raster format has an advantage of reproducibility of color and gradation, but it is considered that the reproducibility of an edge area, which represents a line or a boundary included in an image, needs improvement.

The term "vector format" refers to an image description format in which an image is represented by using vector data. The term "vector data" refers to data representing figures, such as a point, a line, and a polygon, by using coordinate values and attribute information. An image in vector format is saved in a file format such as SVG, PDF, or HTML. In the present exemplary embodiment, an image in vector format is saved in a file format SVG. When an illustration or a graphic is represented by using data in vector format, although the amount of data can be reduced compared with a representation in raster format, it is considered that the reproducibility of color and gradation needs improvement.

The user terminal 30 is an information processing apparatus such as a personal computer, a tablet terminal, or a smartphone, which is operated by a user. The user terminal 30 is configured to accept an input operation for specifying a page containing the image of a target object for image processing. In addition, the user terminal 30 is configured to accept an input operation for specifying the image of a target object for image processing among all the images in the specified page.

Further, the user terminal 30 is configured to accept an input operation for specifying at least one of an area to be represented in raster format and an area to be represented in vector format in the image of the specified object. Then, in response to generation of an image of the object by the management server 10 based on information provided by the input operation, the image including an area represented in raster format and an area represented in vector format, the user terminal 30 acquires and presents the image of the object. Detailed description of these procedures performed by the user terminal 30 will be given below.

Each function described above regarding the management server 10 and the user terminal 30, which form the information processing system 1, is presented by way of illustration, and the information processing system 1 may be capable of performing the functions described above as a whole. Thus, some or all of the functions described above may be shared by the apparatuses in the information processing system 1. Alternatively, the apparatuses in the information processing system 1 may cooperate with each other to provide some or all of the functions described above. Specifically, some or all of the functions of the management server 10 may be provided as a function of the user terminal 30, or some or all of the functions of the user terminal 30 may be provided as a function of the management server 10. Further, a portion or the whole of each function of the management server 10 and the user terminal 30, which form the information processing system 1, may be provided by another apparatus such as a server, which is not depicted. In this way, the entire process of the information processing system 1 can be accelerated, and the apparatuses in the information processing system 1 can complement each other in performing the process.

Hardware Configuration of Management Server

Figure 2:
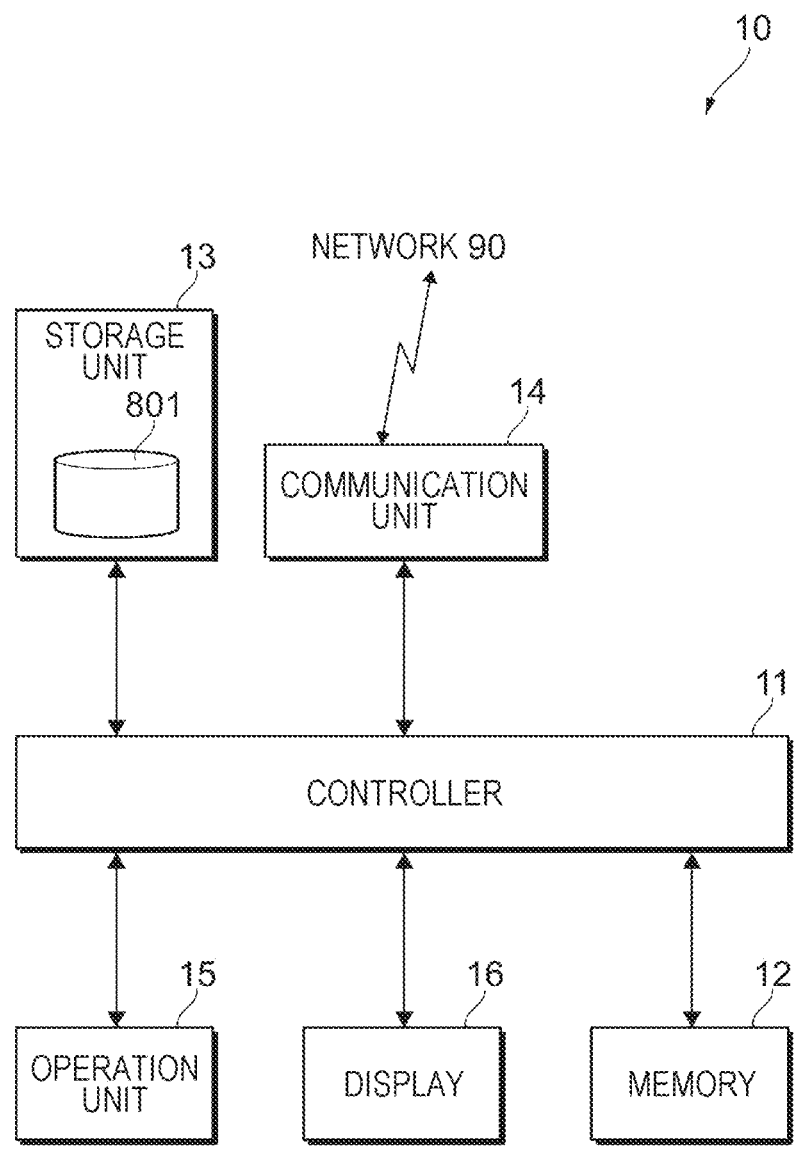
FIG. 2 is a diagram depicting a hardware configuration of a management server.

FIG. 2 is a diagram depicting a hardware configuration of the management server 10.

The management server 10 includes a controller 11, a memory 12, a storage unit 13, a communication unit 14, an operation unit 15, and a display 16. These units are connected to each other by using buses such as a data bus, an address bus, and a peripheral component interconnect (PCI) bus.

The controller 11 is a processor configured to control the function of the management server 10 through execution of various kinds of software, such as an operating system (OS, system software) and application programs (application software). The controller 11 is formed, for example, by a central processing unit (CPU). The memory 12 is a memory area for storing, for example, various kinds of software and data used for executing those kinds of software and is used as a work area for computing. The memory 12 is formed by a memory device such as a random access memory (RAM).

The storage unit 13 is a memory area for storing, for example, data that is input into various kinds of software and data that is output from various kinds of software. The storage unit 13 is formed by devices such as a hard disk drive (HDD), a solid state drive (SSD), and a semiconductor memory, which are used to store, for example, programs and various kinds of setting data. The storage unit 13 includes, for example, an image database (DB) 801 configured to store still and moving images as a database for storing various kinds of information.

The communication unit 14 is configured to transmit and receive data to and from the user terminal 30 and external devices via the network 90. The operation unit 15 is formed, for example, by a keyboard, a mouse, a mechanical button, and a switch and configured to accept an input operation. The operation unit 15 also includes a touch sensor, which is integrated with the display 16 to form a touch panel. The display 16 is formed, for example, by a liquid crystal display or an organic electroluminescence (EL) display, which is used to present information, and configured to present data such as image data and text data.

Hardware Configuration of User Terminal

The hardware configuration of the user terminal 30 is similar to the hardware configuration of the management server 10, which is depicted in FIG. 2. Thus, the hardware configuration of the user terminal 30 will be neither depicted nor described.

Functional Configuration of Controller of Management Server

Figure 3:
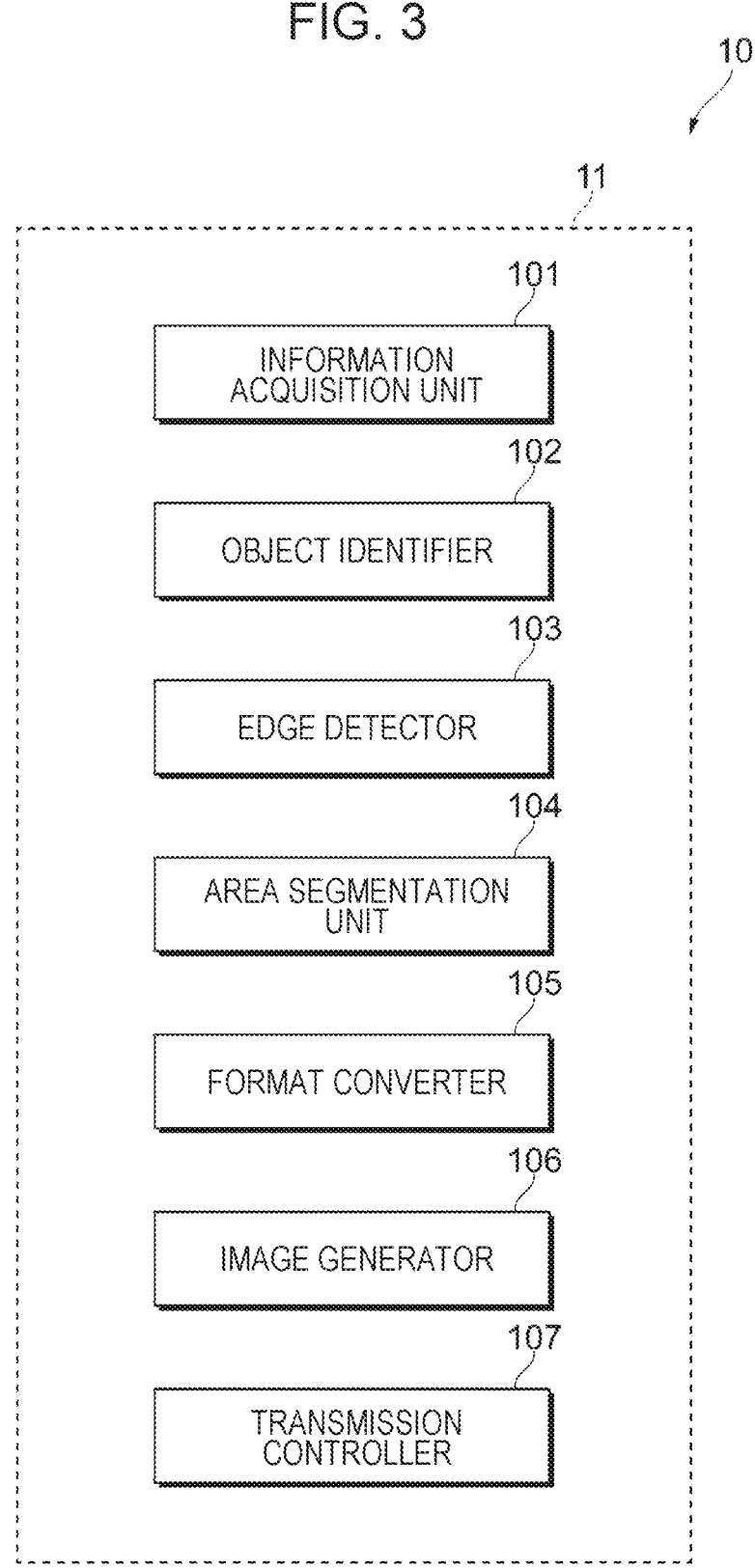
FIG. 3 is a diagram depicting a functional configuration of a controller of the management server.

FIG. 3 is a diagram depicting a functional configuration of the controller 11 of the management server 10.

In the controller 11 of the management server 10, an information acquisition unit 101, an object identifier 102, an edge detector 103, an area segmentation unit 104, a format converter 105, an image generator 106, and a transmission controller 107 operate.

The information acquisition unit 101 is configured to acquire various kinds of information. For example, the information acquisition unit 101 acquires information that is specified by the user and that is transmitted from the user terminal 30 (hereinafter, referred to as "specification information"). Specification information contains, for example, information regarding a page specified as a target page for image processing and information regarding an object specified as a target object for image processing in the specified page.

The information regarding a page specified as a target page for image processing contains image data of the entire page specified as the target page for image processing or information for accessing the image data of the entire page specified as the target page for image processing. The specification information also contains information regarding an area specified as an area to be represented in raster format and information regarding an area specified as an area to be represented in vector format in the specified object.

The object identifier 102 is configured to identify a target object for image processing among one or more objects contained in the image of an entire page specified as a target page for image processing. For example, the object identifier 102 identifies a target object for image processing among one or more objects based on specification information acquired by the information acquisition unit 101. In such a case, the specification information contains information regarding a page specified as a target page for image processing and information regarding an object specified as a target object for image processing among one or more objects contained in the page, and the object identifier 102 identifies a target object for image processing based on the information regarding the page and the information regarding the object contained in the specification information.

Further, for example, if the information acquisition unit 101 fails to acquire specification information, the object identifier 102 analyzes the image of the entire page and, based on the result of the analysis, extracts a candidate object for image processing from the one or more objects contained in the image. One or more objects that have been extracted as candidate objects for image processing are presented by a display of the user terminal 30 so as to be selected and specified. In response to specification of a target object for image processing, specification information at least containing information regarding the specification is transmitted from the management server 10 to the user terminal 30.

The edge detector 103 is configured to detect one or more edges in an image of an object identified by the object identifier 102 as a target object for image processing. The method used by the edge detector 103 to detect an edge is not limited to any specific one, and the edge detector 103 may detect an edge, for example, by using processes such as detection of spatial frequencies, dilation and erosion, and Laplacian filtering.

Of these methods, when an edge is detected by using a process of detecting spatial frequencies, the edge detector 103 expresses one or more areas having a high spatial frequency in vector format and expresses other non-edge areas in raster format. When an edge is detected by using dilation and erosion, the edge detector 103 detects an edge by expanding a white region of a binary image by dilation and reducing a white region by erosion. For example, for each of the three colors red, green, and blue in the RGB color model, dilation of n×n (where n usually equals 3 or 5) and erosion of n×n are performed, and a difference (absolute value) between the two is calculated. Laplacian filtering refers to spatial filtering used to detect an edge in an image of an object by using second derivatives. Further, the edge detector 103 may be configured to perform a process of detecting an edge by using a machine learning model.

The area segmentation unit 104 is configured to segment an image of an object identified by the object identifier 102 as a target object for image processing into an area to be represented in raster format and an area to be represented in vector format. The segmentation is performed in accordance with the property of the object. Specifically, the area segmentation unit 104 is configured to segment an image of an object into an area to be represented in raster format and an area to be represented in vector format based on a result of edge detection obtained by the edge detector 103. For example, the area segmentation unit 104 designates an edge area as an area to be represented in vector format and designates a non-edge area, which is not an edge area, as an area to be represented in raster format.

Further, the area segmentation unit 104 may be configured to segment an image of an object identified by the object identifier 102 as a target object for image processing into a candidate area for editing and an area not for editing. The segmentation is performed in accordance with the property of the object. In such a case, for example, the area segmentation unit 104 may define an area designated as an area to be represented in vector format as a candidate area for editing and define an area designated as an area to be represented in raster format as an area not for editing. Examples of "editing" include editing for animation.

Further, the area segmentation unit 104 may be configured to segment an image of an object into an area to be represented in raster format and an area to be represented in vector format based on a result of a conversion process performed by the format converter 105, which is described below. In such a case, the format converter 105 first converts the image of the object, which is represented in raster format, into a representation in vector format and thereafter converts the representation in vector format into a representation in raster format again. Then, the area segmentation unit 104 compares the images in raster format before and after the conversion and segments the image of the object into an area to be represented in raster format and an area to be represented in vector format based on the difference between the images in raster format before and after the conversion.

In the method of comparing the images in raster format before and after the conversion, an area having a large difference between the images in raster format before and after the conversion may be designated as an area to be represented in raster format, and an area having a small difference between the images in raster format before and after the conversion may be designated as an area to be represented in vector format. Examples of the "difference" discussed here include a difference between feature values of images. In such a case, the area segmentation unit 104 segments the image of the object into an area to be represented in raster format and an area to be represented in vector format, for example, by using a predetermined function for evaluating a difference between feature values.

The format converter 105 is configured to convert a description format of a portion or all of an image (still image, moving image). For example, the format converter 105 converts an image of an object specified as a target object for image processing into a representation in vector format if the image of the object is represented in raster format and converts an image of an object specified as a target object for image processing into a representation in raster format if the image of the object is represented in vector format. In addition, for example, if an image of an object represented in raster format includes an area to be represented in vector format, the format converter 105 converts the image of the area to be represented in vector format into a representation in vector format, and if an image of an object represented in vector format includes an area to be represented in raster format, the format converter 105 converts the image of the area to be represented in raster format into a representation in raster format.

For example, the format converter 105 uses the following methods to convert an image of an object represented in raster format to a representation in vector format. Specifically, in converting an image of an object represented in raster format, the format converter 105 performs such processes as color reduction, color division, separating color layers, extracting a border and a point in each color layer, generating vector data for each color layer, drawing an image, combining color layers, and correcting a lost portion of a drawn image.

Of these processes performed by the format converter 105, for the process of color reduction of an image of an object represented in raster format, algorithms such as the vector quantization algorithm, the median cut algorithm, and the K-means algorithm are used. In the vector quantization algorithm, multiple pixels or entities corresponding to the multiple pixels are collectively mapped onto a single symbol, thereby leading to color reduction of an image. In the median cut algorithm, a pixel represented in the RGB color model is regarded as a point represented by three-dimensional coordinates in a cuboid, and the cuboid is repeatedly divided into two parts at the median so that the number of pixels included in one part equals the number of pixels included in the other part. In the K-means algorithm, pixels are divided into multiple groups based on representative colors, and the average color of pixels in each group is calculated and substituted for the representative color of the group repeatedly until the representative color stops changing, thereby leading to color reduction of an image.

The format converter 105 can also convert an image of an object represented in raster format into a representation in vector format and thereafter convert the representation in vector format into a representation in raster format again. Further, the format converter 105 can also convert an image of an object represented in vector format into a representation in raster format and thereafter convert the representation in raster format into a representation in vector format again. The format converter 105 may optionally generate a mask data when converting an image into a representation in a different image description format.

The image generator 106 is configured to generate an image of an object including an area represented in raster format and an area represented in vector format based on the result of the conversion process performed by the format converter 105. For example, the image generator 106 generates an image of an object including the area represented in raster format and the area represented in vector format by making a composite of an image of the area represented in raster format and an image of the area represented in vector format. Specifically, for example, the image generator 106 generates an image of an object including an area represented in raster format and an area represented in vector format by partially replacing an image of an area represented in raster format as a draft image with an image of an area represented in vector format and thus making a composite image. A specific example of an image generated by the image generator 106 will be described below with reference to FIG. 10.

Further, for example, if an image of an area represented in vector format is animated by editing, the image generator 106 partially replaces an image of an area represented in raster format as a draft image with an animated image of the area represented in vector format, thus making a composite image, and generates an image of the object including an area represented in raster format and an area that is represented in vector format and at least a portion of which is animated.

The transmission controller 107 is configured to transmit to the user terminal 30 information regarding a target object for image processing, which is identified by the object identifier 102. Further, the transmission controller 107 is configured to transmit to the user terminal 30 an image of an object that is generated by the image generator 106 and that includes an area represented in raster format and an area represented in vector format.

Functional Configuration of Controller of User Terminal

Figure 4:
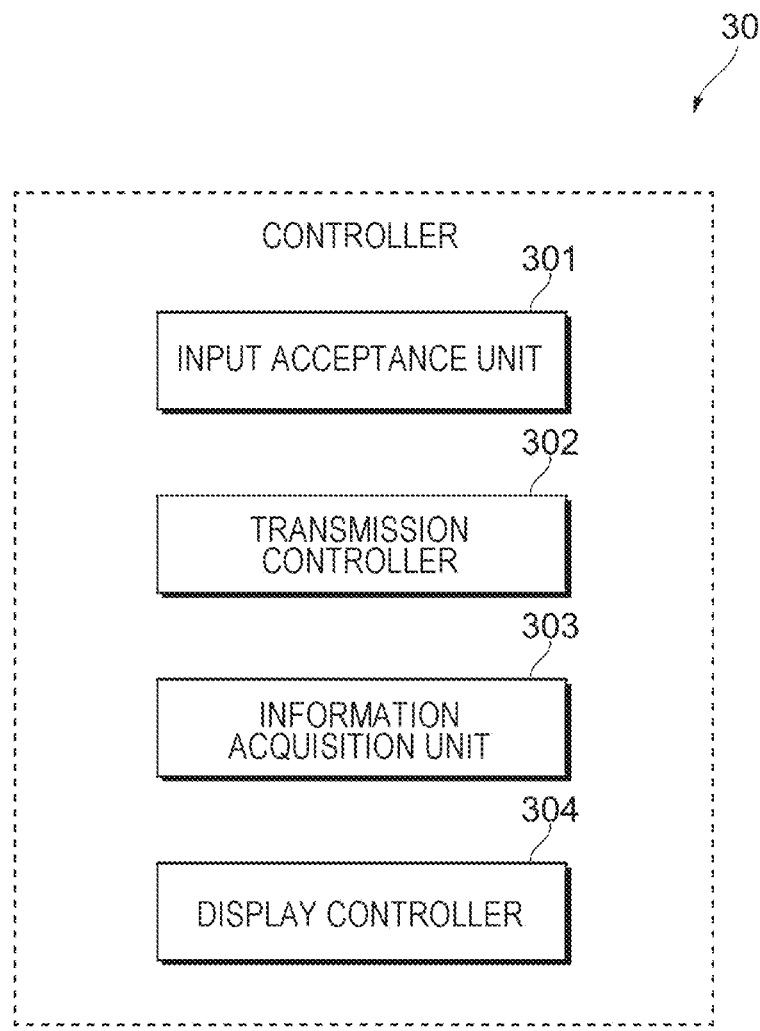
FIG. 4 is a diagram depicting a functional configuration of a controller of a user terminal.

FIG. 4 is a diagram depicting a functional configuration of a controller of the user terminal 30.

In the controller of the user terminal 30, an input acceptance unit 301, a transmission controller 302, an information acquisition unit 303, and a display controller 304 operate.

The input acceptance unit 301 is configured to accept an input operation from the user as a first acceptance unit or a second acceptance unit. For example, the input acceptance unit 301 accepts an input operation for specifying a target page for image processing. Further, for example, the input acceptance unit 301 accepts an input operation for specifying a target object for image processing contained in the specified page. Further, for example, the input acceptance unit 301 accepts an input operation for specifying an area to be represented in raster format in the image of the specified object.

Further, for example, the input acceptance unit 301 accepts an input operation for specifying an area to be represented in vector format in the image of the specified object. Further, for example, the input acceptance unit 301 accepts an input operation for specifying an area to be animated in the image of the object identified as a target object for image processing. Specifically, the input acceptance unit 301 accepts an input operation for specifying, as an area to be animated, an image of an area designated as an area to be represented in vector format in the image of the object identified as a target object for image processing.

An input operation on the user terminal 30 may be performed, for example, by using a user interface presented by the display in response to the start of dedicated application software installed on the user terminal 30 or by using a user interface presented by the display in response to the access to a dedicated website.

The transmission controller 302 is configured to transmit to the management server 10 information provided by an input operation accepted by the input acceptance unit 301. Specifically, for example, the transmission controller 302 is configured to transmit to the management server 10 specification information as the information provided by an accepted input operation.

The information acquisition unit 303 is configured to acquire various kinds of information. For example, the information acquisition unit 303 acquires information transmitted from the management server 10 regarding an object identified as a target object for image processing. Further, for example, the information acquisition unit 303 acquires an image of an object that is transmitted from the management server 10 and that contains an image of an area represented in raster format and an image of an area represented in vector format.

The display controller 304 is configured to cause the display to present various kinds of information. For example, the display controller 304 is configured to cause the display to present an image of an object that is acquired by the information acquisition unit 303 and that is identified as a target object for image processing. Further, for example, the display controller 304 is configured to cause the display to present an image of an object that is acquired by the information acquisition unit 303 and that contains an image of an area represented in raster format and an image of an area represented in vector format. Such images may be presented by using the user interfaces described above.

Process Performed by Management Server

Figure 5A:
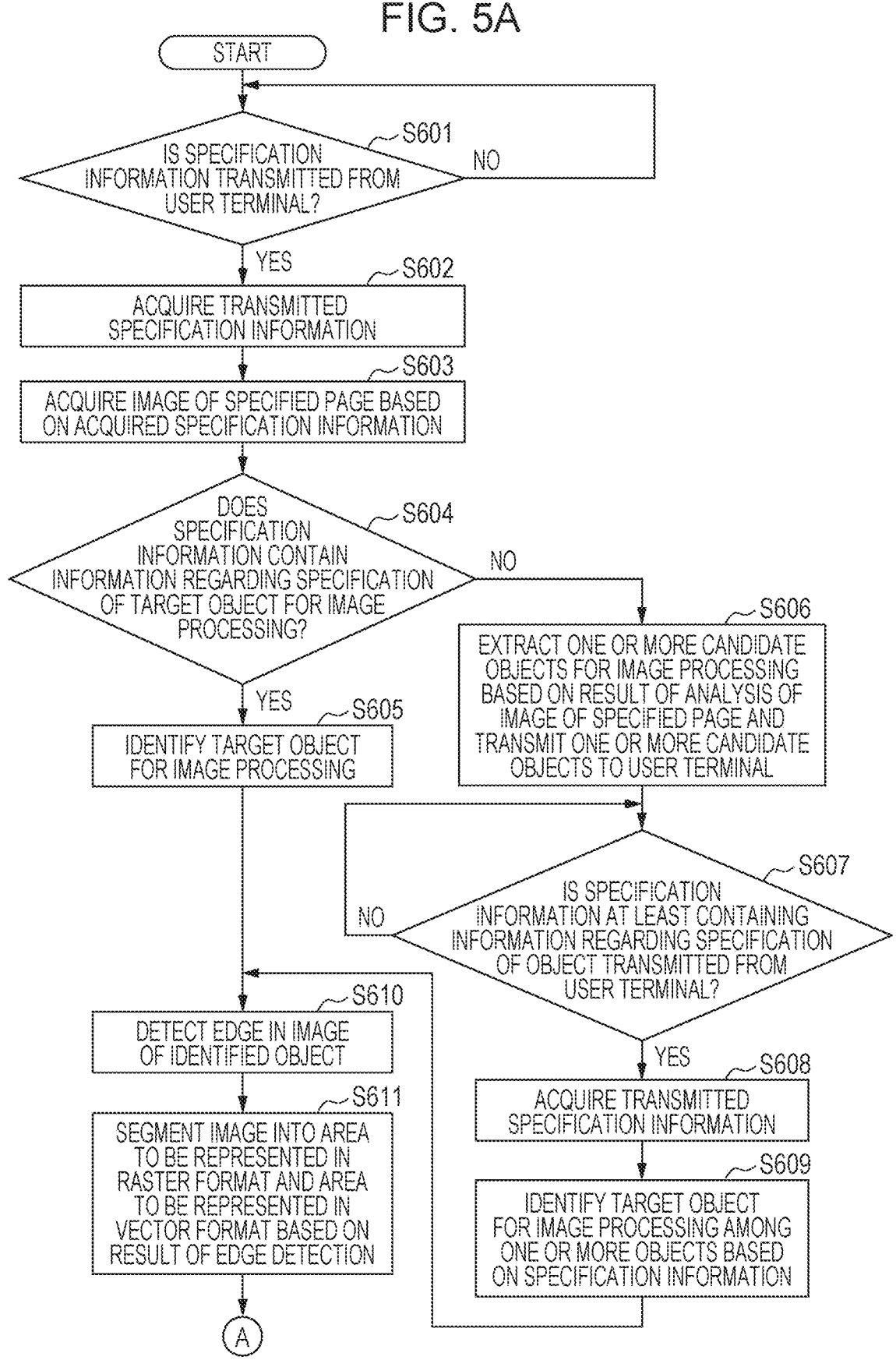
FIGS. 5A and 5B illustrate a flowchart depicting a process performed by the management server.
Figure 5B:
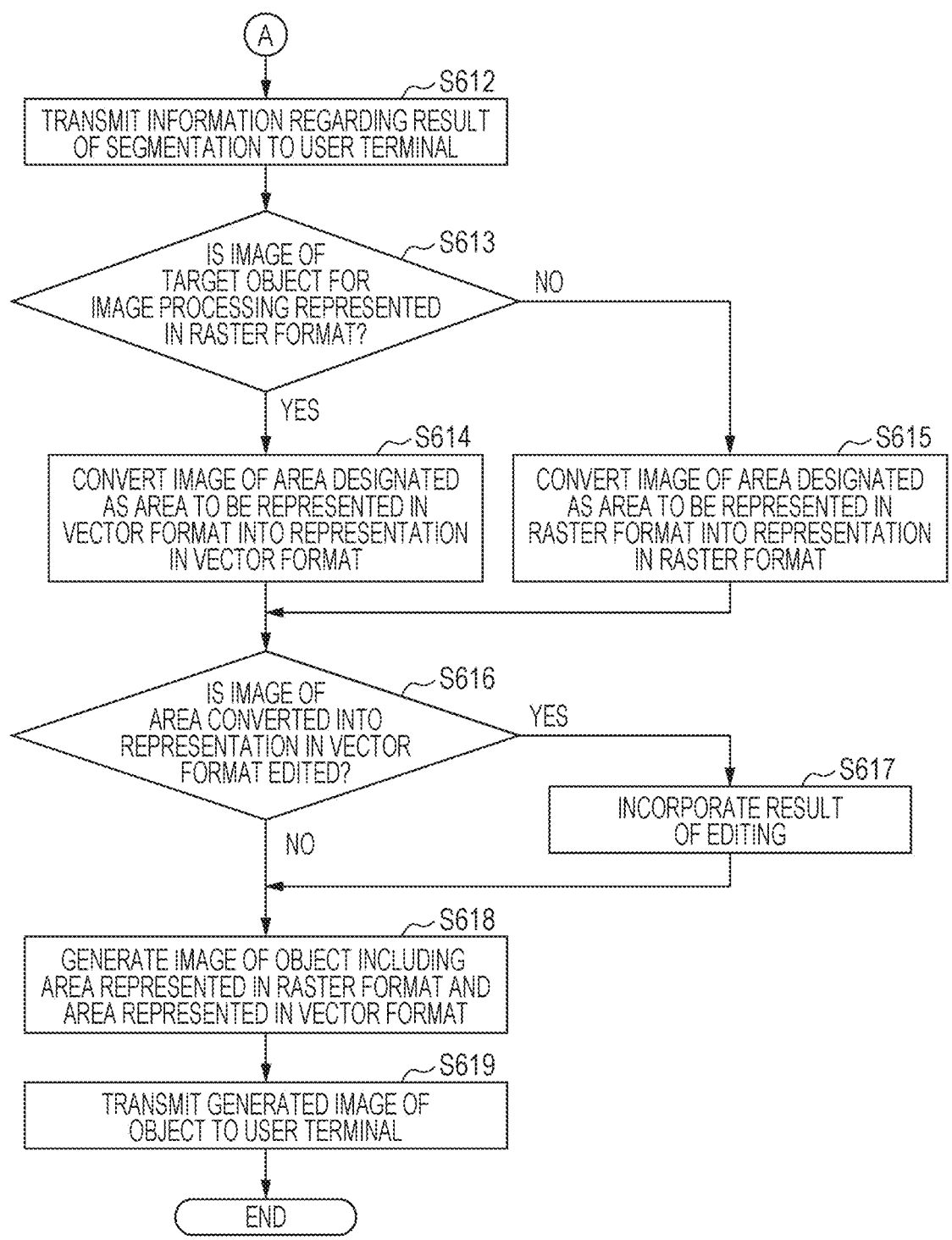

FIGS. 5A and 5B illustrate a flowchart depicting a process performed by the management server 10.

In response to specification information transmitted from the user terminal 30 (YES in step S601), the management server 10 acquires the transmitted specification information (step S602) and, based on the acquired specification information, acquires an image of an entire page that is specified (step S603). In contrast, while specification information is not transmitted from the user terminal 30 (NO in step S601), the management server 10 repeats step S601 until specification information is transmitted from the user terminal 30.

If the specification information acquired in step S602 contains information regarding the specification of a target object for image processing (YES in step S604), the management server 10 identifies the target object for image processing based on the information (step S605) and proceeds to step S610. In contrast, if the specification information does not contain information regarding the specification of a target object for image processing (NO in step S604), the management server 10 analyzes the image of the entire page that is specified and, based on the result of the analysis, extracts one or more candidate objects for image processing. Then, the management server 10 transmits the one or more candidate objects to the user terminal 30 (step S606).

If specification information at least containing information regarding the specification of a target object for image processing is transmitted from the user terminal 30 (YES in step S607), the management server 10 acquires the transmitted specification information (step S608) and identifies the target object for image processing among the one or more candidate objects based on the acquired information (step S609). In contrast, while specification information is not transmitted from the user terminal 30 (NO in step S607), the management server 10 repeats step S607 until specification information is transmitted from the user terminal 30.

The management server 10 detects one or more edges in the image of the object identified as the target object for image processing (step S610) and, based on the result of the detection, segments the image of the object into an area to be represented in raster format and an area to be represented in vector format (step S611). Then, the management server 10 transmits information regarding the result of the segmentation to the user terminal 30 (step S612). Specifically, the management server 10 designates an edge area as an area to be represented in vector format, designates a non-edge area, which is not an edge area, as an area to be represented in raster format, and transmits information regarding the result of the segmentation to the user terminal 30.

If the image of the target object for image processing is represented in raster format (YES in step S613), the management server 10 converts into a representation in vector format the image of the area designated in the image of the object as an area to be represented in vector format (step S614). In contrast, if the image of the target object for image processing is represented in vector format (NO in step S613), the management server 10 converts into a representation in raster format the image of the area designated in the image of the object as an area to be represented in raster format (step S615).

If the image of the area converted into a representation in vector format is edited (YES in step S616), the management server 10 incorporates the result of the editing (step S617) and generates an image of the object including the area represented in raster format and the area represented in vector format (step S618). In contrast, if the image of the area converted into a representation in vector format is not edited (NO in step S616), the management server 10 skips step S617 and proceeds to step S618. The management server 10 transmits the image of the object generated in step S618 to the user terminal 30 (step S619).

Process Performed by User Terminal

Figure 6A:
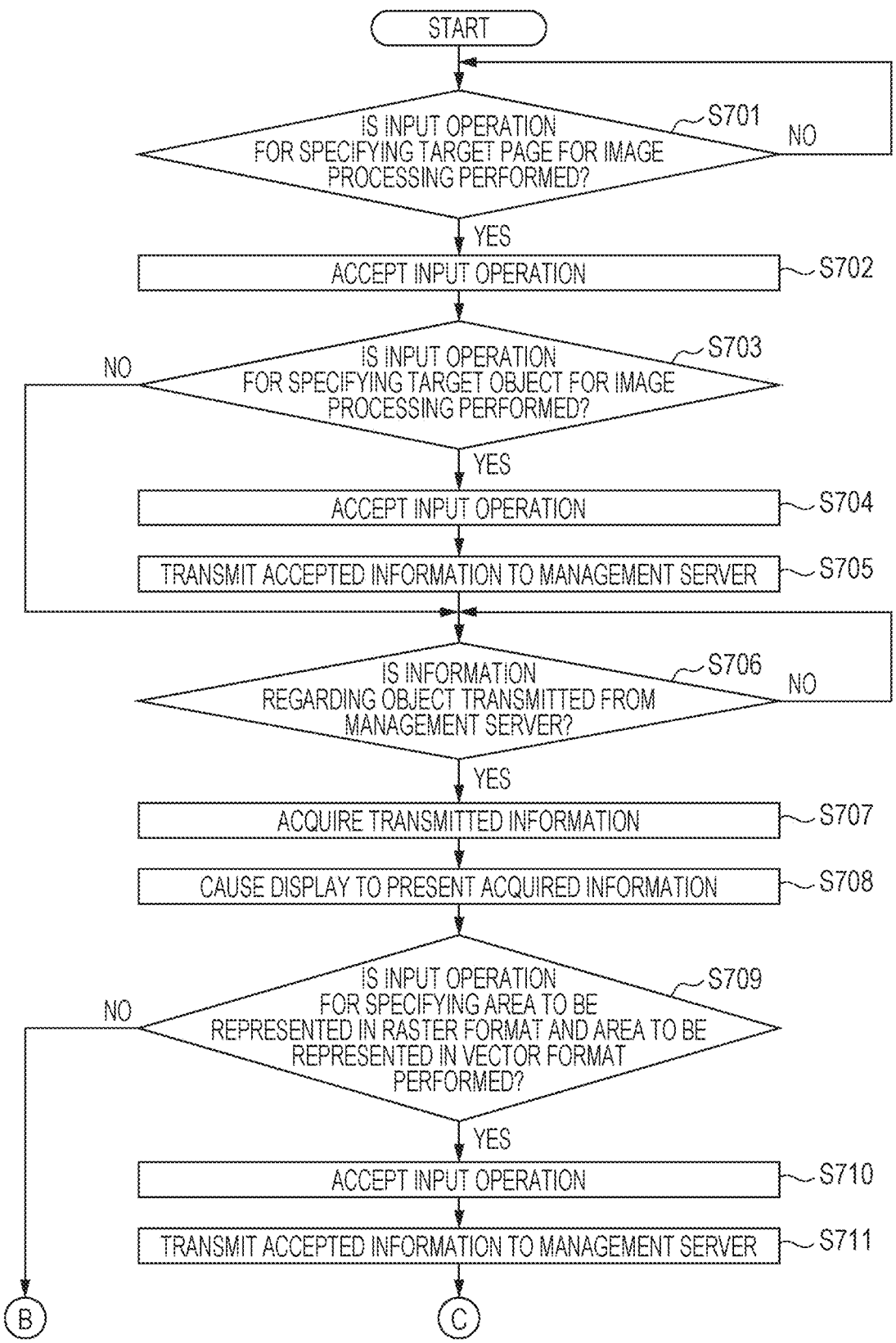
FIGS. 6A and 6B illustrate a flowchart depicting a process performed by the user terminal.
Figure 6B:
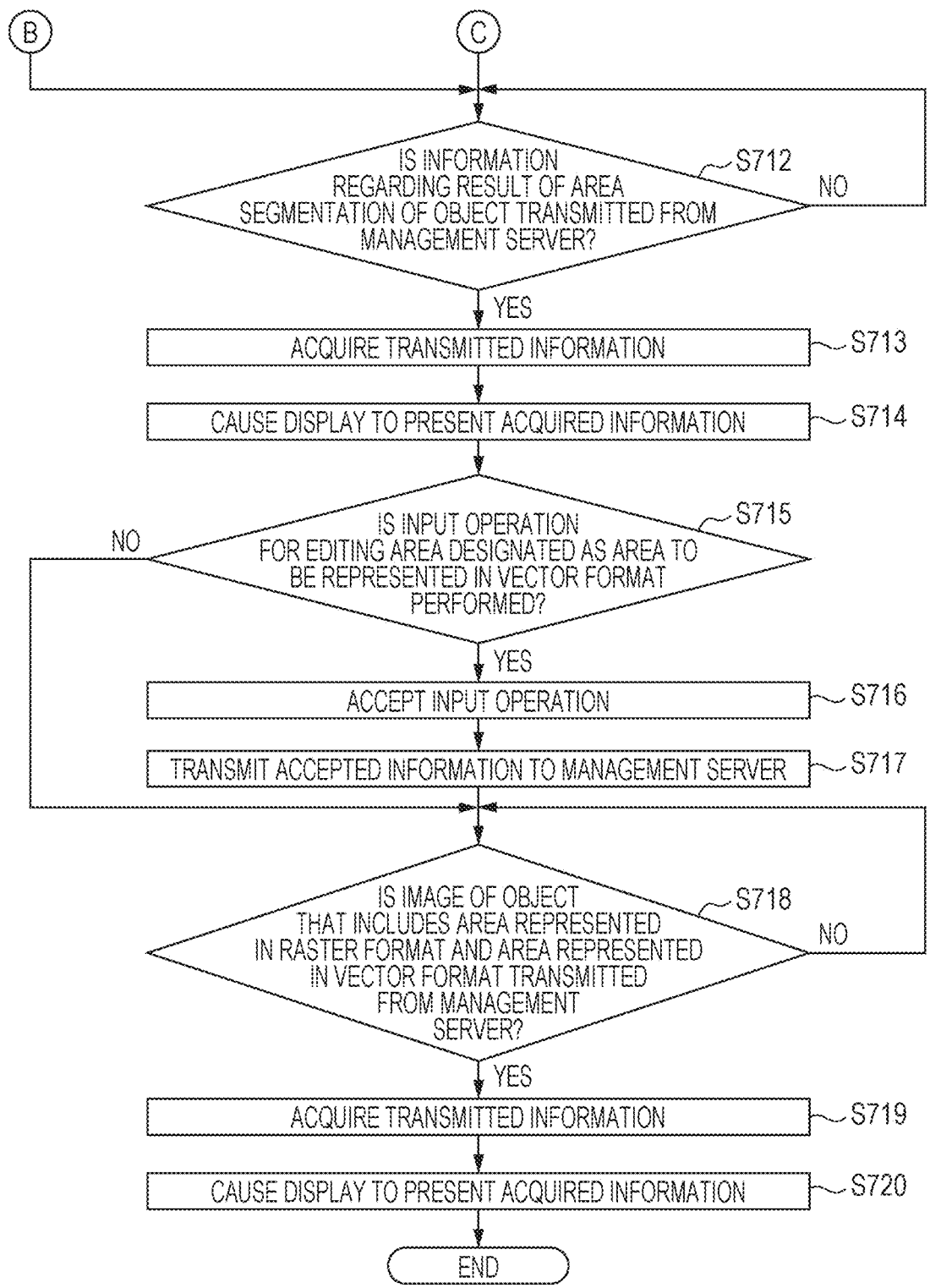

FIGS. 6A and 6B illustrate a flowchart depicting a process performed by the user terminal 30.

In response to an input operation for specifying a target page for image processing (YES in step S701), the user terminal 30 accepts the input operation (step S702). In contrast, while an input operation for specifying a target page for image processing is not performed (NO in step S701), the user terminal 30 repeats step S701 until an input operation for specifying a target page for image processing is performed.

In response to an input operation for specifying a target object for image processing among one or more objects contained in the specified page (YES in step S703), the user terminal 30 accepts the input operation (step S704) and transmits the accepted information to the management server 10 (step S705). In contrast, if an input operation for specifying a target object for image processing is not performed (NO in step S703), the process proceeds to step S706.

If information regarding an object identified as a target object for image processing is transmitted from the management server 10 (YES in step S706), the user terminal 30 acquires the transmitted information (step S707) and causes the display to present the acquired information (step S708). In contrast, while information regarding an object identified as a target object for image processing is not transmitted (NO in step S706), the user terminal 30 repeats step S706 until information regarding an object identified as a target object for image processing is transmitted.

In response to an input operation for specifying an area to be represented in raster format and an area to be represented in vector format in the specified object (YES in step S709), the user terminal 30 accepts the input operation (step S710) and transmits the accepted information to the management server 10 (step S711). In contrast, if an input operation for specifying an area to be represented in raster format and an area to be represented in vector format is not performed (NO in step S709), the process proceeds to step S712.

If information regarding a result of area segmentation of the object identified as the target object for image processing is transmitted from the management server 10 (YES in step S712), the user terminal 30 acquires the transmitted information (step S713) and causes the display to present the acquired information (step S714). In contrast, while information regarding a result of area segmentation is not transmitted (NO in step S712), the user terminal 30 repeats step S712 until the information regarding a result of area segmentation is transmitted.

In response to an input operation for editing the area designated by the management server 10 as an area to be represented in vector format (YES in step S715), the user terminal 30 accepts the input operation (step S716) and transmits the accepted information to the management server 10 (step S717). Examples of an input operation for editing include an input operation for animating at least a portion of the area designated as an area to be represented in vector format. In contrast, if an input operation for editing the area designated as an area to be represented in vector format is not performed (NO in step S715), the process proceeds to step S718.

If an image of the object including the area represented in raster format and the area represented in vector format is generated as a result of image processing by the management server 10 and the image of the object is transmitted from the management server 10 (YES in step S718), the user terminal 30 acquires the transmitted information (step S719) and causes the display to present the acquired information (step S720). In contrast, while an image of the object including the area represented in raster format and the area represented in vector format is not transmitted (NO in step S718), the user terminal 30 repeats step S718 until an image of the object is transmitted.

Specific Example

Figure 7B:
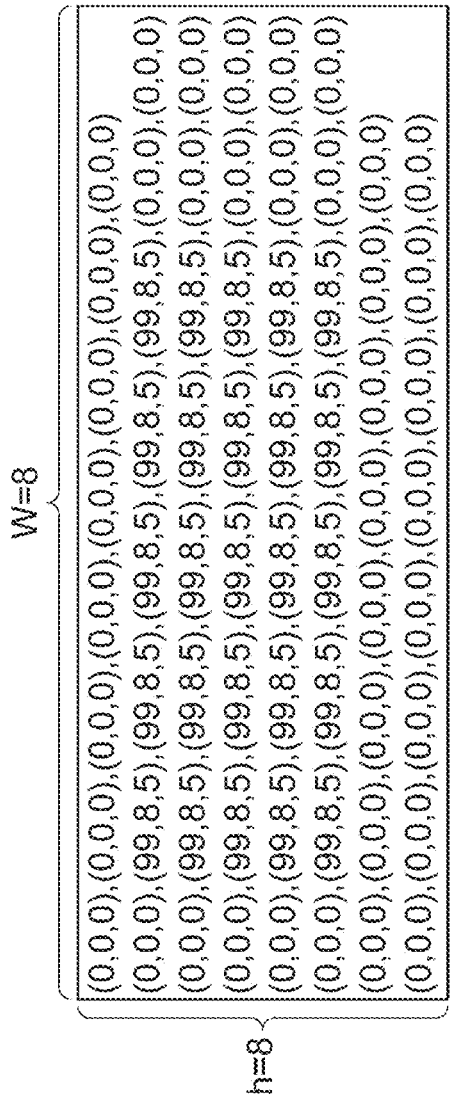
FIG. 7B is an illustration depicting a specific example of a data structure representing the image in FIG. 7A in raster format.
Figure 7A:
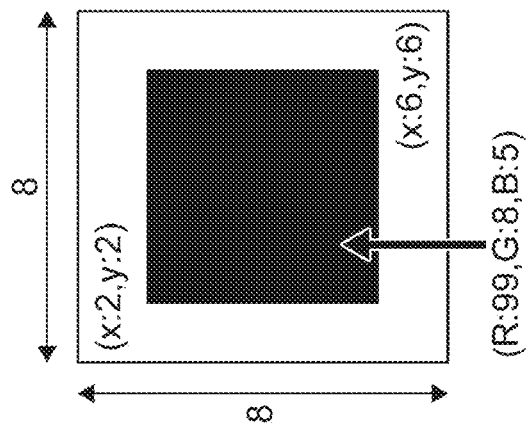
FIG. 7A is an illustration depicting a specific example of an image.

FIG. 7A is an illustration depicting a specific example of an image. FIG. 7B is an illustration depicting a specific example of a data structure representing the still image in FIG. 7A in raster format.

The still image depicted in FIG. 7A is an image having a colored square disposed in the central region of an area defined by a square frame. FIG. 7B depicts a data structure representing the image in FIG. 7A in raster format. As depicted in FIG. 7B, an image is represented in raster format by data formed by pixels that are represented in the RGB color model and that are arranged in a grid pattern extending vertically and horizontally. For example, "(0, 0, 0)" represents a white pixel, and "(99, 8, 5)" represents a colored pixel. An image represented in raster format becomes grainy and degraded in quality when enlarged. Thus, to avoid degradation of image quality, resolution of an image needs to be increased by increasing the number of pixels, leading to an increase in the amount of data in accordance with the increase in resolution.

Figure 8:
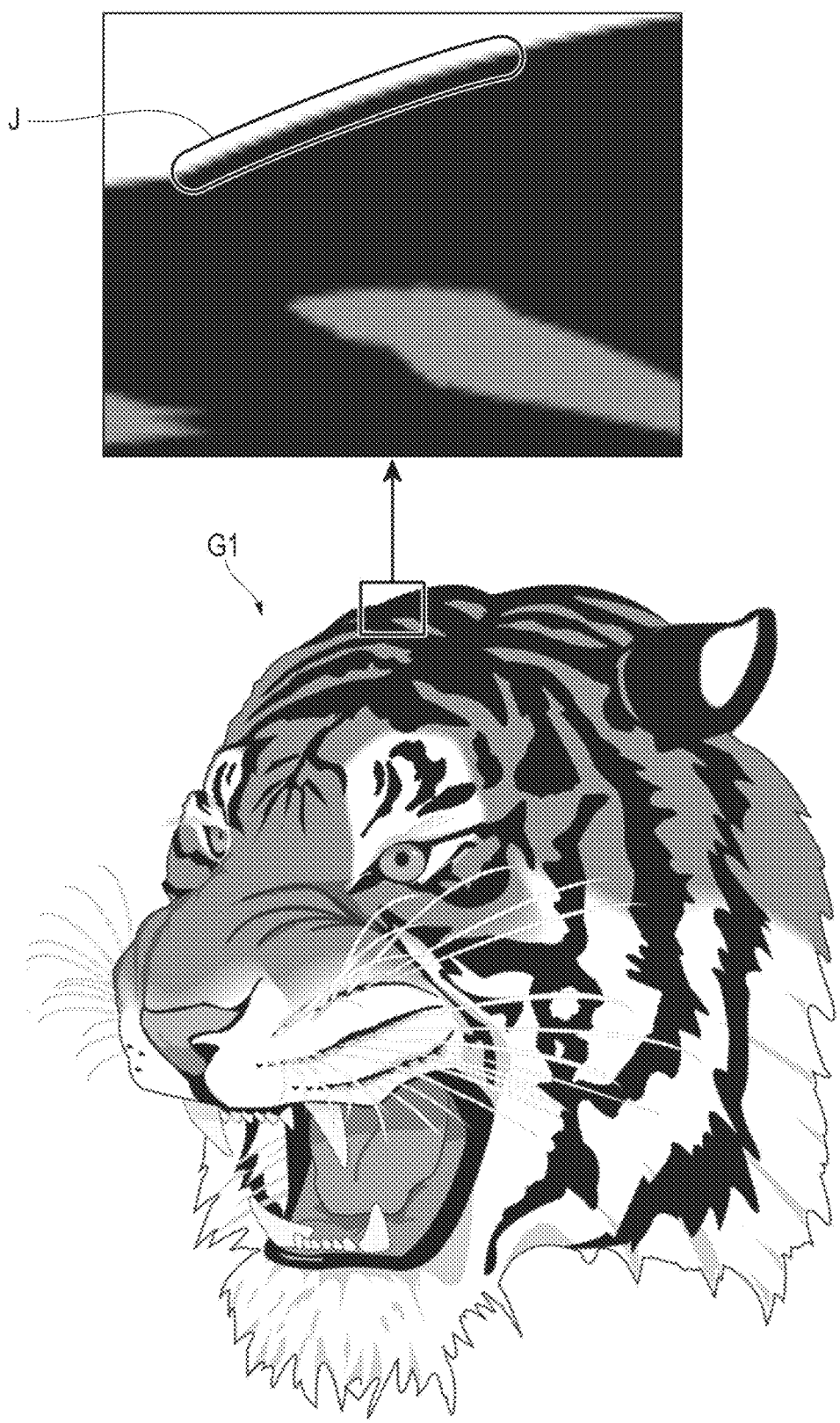
FIG. 8 is an illustration depicting a specific example of an image of an object represented only in raster format.
Figure 9:
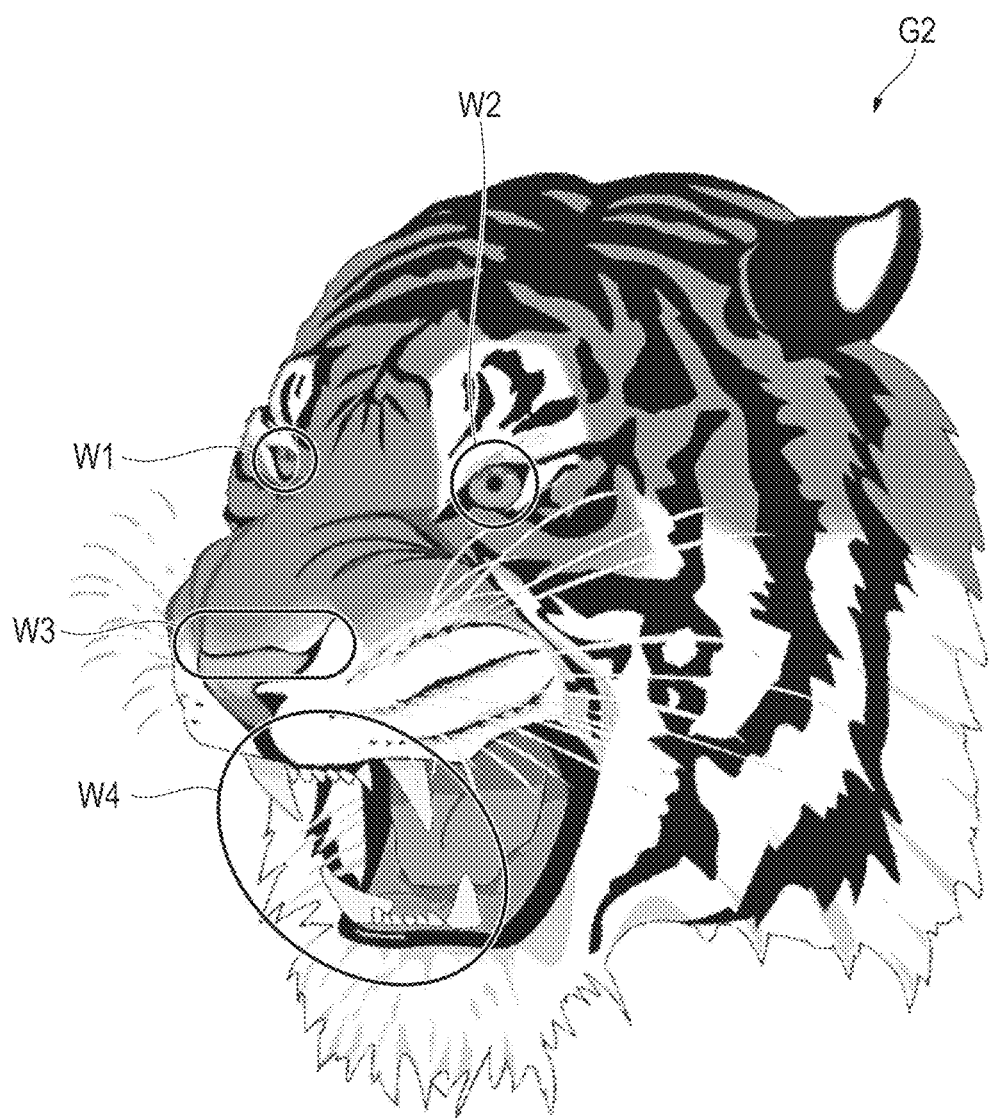
FIG. 9 is an illustration depicting a specific example of an image of an object represented only in vector format.

FIG. 8 is an illustration depicting a specific example of an image of an object represented only in raster format. FIG. 9 is an illustration depicting a specific example of an image of an object represented only in vector format.

The image in raster format depicted in FIG. 8 is an image G1 of an object identified as a target object for image processing in an image of an entire page, which is not depicted. The image G1 is a graphic image depicting the head of a tiger by using edges and gradations of color and brightness. Since an image in raster format is represented by pixels having different densities and pixels having various colors, when the image G1 is enlarged, image quality is degraded, leading to an outline having step-like jaggies J as illustrated in the frame in FIG. 8. Thus, to achieve image quality that is satisfactory to the user without jaggies J even when the image G1 is enlarged, the resolution of the image G1 needs to be increased. However, an increase in the resolution of the image G1 is accompanied by an increase in the amount of data of the image G1.

The image in vector format depicted in FIG. 9 is an image G2 of an object represented only in vector format. Since the image G2 is represented by using vector data, image quality is not degraded when the image G2 is enlarged, but a dull color, a stepwise change in gradation, a color change, and other deficiencies are likely to appear because of color reduction due to conversion. Specifically, for example, in the example in FIG. 9, a dull color appears in the areas including the eyes of the tiger enclosed by a border W1 and a border W2, a stepwise change in color gradation appears in the area including the top of the nose of the tiger enclosed by a border W3, and a change such as a color change appears in the area including the teeth of the tiger enclosed by a border W4.

Thus, in the present exemplary embodiment, an image of an object including an area represented in raster format and an area represented in vector format is generated to provide an image that can achieve image quality satisfactory to the user and that can reduce the amount of data compared with an image represented only in a single image description format. In other words, an image in a so-called hybrid format is generated to incorporate advantages of raster format and vector format. Specifically, in the image of the head of the tiger in FIG. 8, an image of an area having a large number of colors and a large number of gradations is represented in raster format, and an image of an area having a large number of edges is represented in vector format. In this way, an image description format is selected for each area.

Figure 10:
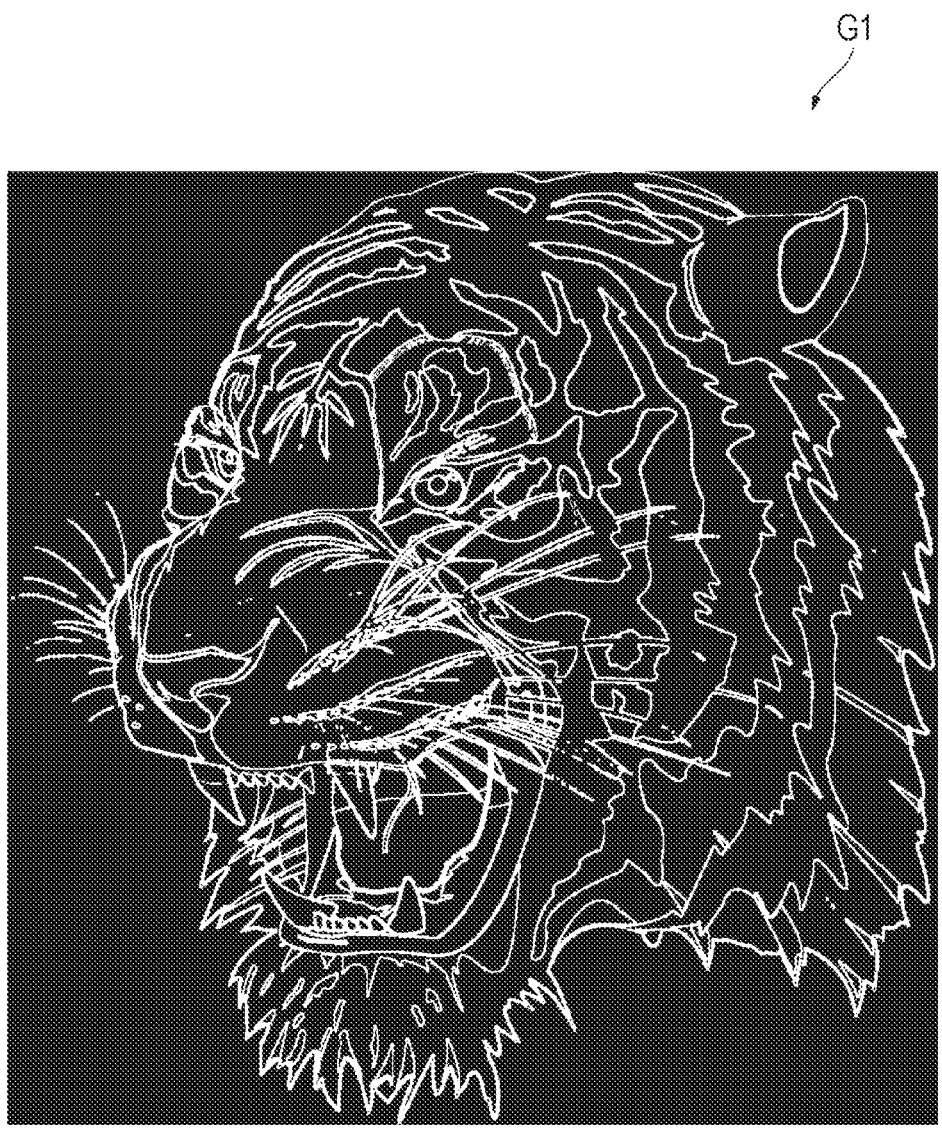
FIG. 10 is an illustration depicting a specific example of an image of an object representing edge areas and other non-edge areas as a result of detection of edge areas.

FIG. 10 is an illustration depicting a specific example of an image of the object representing edge areas and other non-edge areas obtained as a result of detection of edge areas.

FIG. 10 depicts an example of detecting edges by dilation and erosion. Of these regions, regions represented in white are each detected as an edge area and regions represented in color are each designated as a non-edge area.

Figure 11:
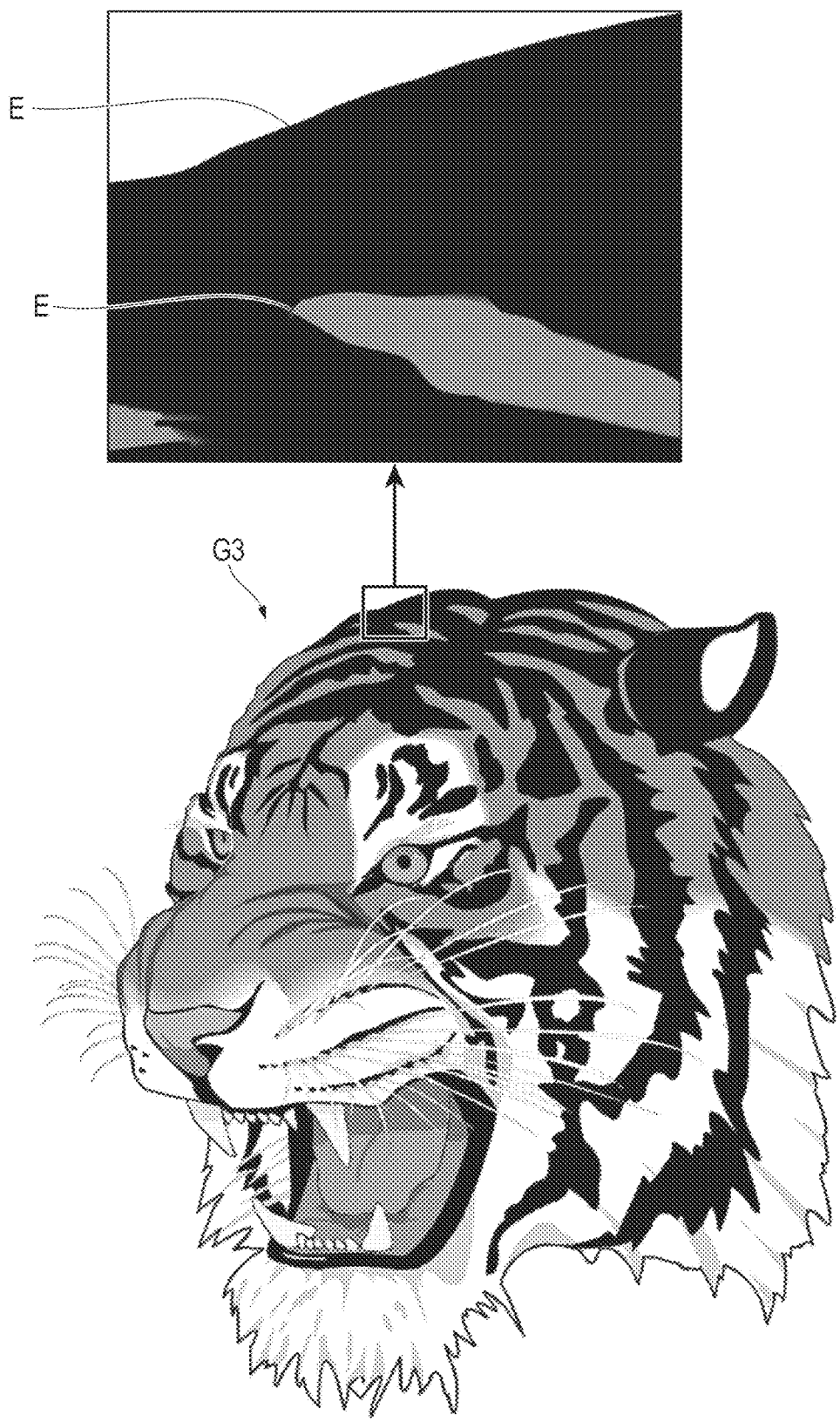
FIG. 11 is an illustration depicting a specific example of an image of an object including areas in which regions each designated as a non-edge area are represented in raster format and areas in which regions each detected as an edge area are represented in vector format based on the result of detection of edge areas depicted in FIG. 10.

FIG. 11 is an illustration depicting a specific example of an image of an object including areas in which regions each designated as a non-edge area are represented in raster format and areas in which regions each detected as an edge area are represented in vector format based on the result of detection of edge areas depicted in FIG. 10.

An image G3 of the object including areas represented in raster format and areas represented in vector format is generated as depicted in FIG. 11 after images of areas to be converted into representations in vector format are converted into representations in vector format in the image G1, which is represented in raster format as depicted above in FIG. 8. The image G3 can provide the same level of color reproducibility as the image G1 in raster format. Specifically, for example, a dull color, a stepwise change in gradation, a color change, and other deficiencies such as appear in the example in FIG. 9, which is represented only in vector format as described above, do not appear in the example in FIG. 11.

Further, since the images of areas including edges E are converted into representations in vector format, a high-quality clear image can be obtained as depicted in the frame in FIG. 11. Jaggies such as are depicted in FIG. 8 do not appear even when the image is enlarged. In this way, it is possible to achieve image quality satisfactory to the user and to reduce the amount of data compared with an image represented only in a single image description format. An image having the advantages described above is web-friendly and thus can be used, for example, as an image to be published on a web page and as an image to be presented for digital signage.

The present exemplary embodiment has been described above, but the present disclosure is not limited to the present exemplary embodiment described above. In addition, effects of the present disclosure are not limited to the effects described in the present exemplary embodiment described above. For example, the configuration of the information processing system 1 depicted in FIG. 1 and the hardware configuration of the management server 10 depicted in FIG. 2 are both described as an example for achieving objects of the present disclosure and not by way of limitation. Further, the functional configuration of the management server 10 depicted in FIG. 3 and the functional configuration of the user terminal 30 depicted in FIG. 4 are also described by way of illustration and not by way of limitation. As long as the information processing system 1 in FIG. 1 has the functionality of performing the above processes as a whole, the functional configurations for achieving the functionality are not limited to the examples depicted in FIGS. 3 and 4.

Further, the orders of the process steps performed by the management server 10 and the user terminal 30, which are depicted in FIGS. 5A and 5B and FIGS. 6A and 6B, respectively, are described by way of illustration and not by way of limitation. The process steps may be performed in chronological order as depicted. Alternatively, the process steps may be performed not necessarily in chronological order but in parallel or individually. The specific examples depicted in FIGS. 7A and 7B and FIG. 8 to FIG. 11 are also depicted by way of illustration and not by way of limitation.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
segment a first image of an object contained in an image into a first area and a second area in accordance with a property of the first image of the object, the first area being to be represented in raster format, the second area being to be represented in vector format;
convert an image of the second area into an image in the vector format if the first image of the object is represented in the raster format and convert an image of the first area into an image in the raster format if the first image of the object is represented in the vector format; and
generate a second image of the object, the second image containing the image of the first area in the raster format and the image of the second area in the vector format,
if the first image of the object is represented in the raster format, generate a third image of the object in the raster format by converting the first image of the object into an image in the vector format and further converting the obtained image in the vector format into an image in the raster format;
segment the first image of the object into the first area and the second area based on a difference between the first image of the object and the third image of the object, and
segment the first image of the object into the first area and the second area based on a difference in a feature value as the difference between the first image of the object and the third image of the object.

2. The information processing apparatus according to claim 1,
wherein the processor is configured to segment the first image of the object into the first area and the second area based on a result of a process of detecting one or more edges in the first image of the object.

3. The information processing apparatus according to claim 2,
wherein the processor is configured to segment the first image of the object into the first area and the second area based on a result of a process performed to detect the one or more edges by using at least one method selected from the group consisting of detection of spatial frequency, dilation, erosion, and Laplacian filtering.

4. The information processing apparatus according to claim 2,
wherein the processor is configured to perform a process of detecting the one or more edges by using a machine learning model.

5. The information processing apparatus according to claim 1,
wherein the processor is configured to, based on an image specified by a user and an area included in the image specified by the user, identify the first image of the object and segment the first image of the object into the first area and the second area.

6. The information processing apparatus according to claim 5,
wherein the second area is designated as a candidate area for editing to be performed by the user.

7. The information processing apparatus according to claim 6,
wherein the editing to be performed by the user is editing for animation.

8. The information processing apparatus according to claim 1,
wherein the processor is configured to generate the second image of the object by making a composite of the image of the first area and the image of the second area.

9. The information processing apparatus according to claim 8,
wherein the processor is configured to generate the second image of the object by partially replacing the image of the first area as a draft image with the image of the second area and making the composite of the image of the first area and the image of the second area.

10. An information processing apparatus comprising:
a processor configured to:
accept a first input operation for specifying a first image of an object contained in an image;
accept a second input operation for specifying at least one of first and second areas in the first image of the object, the first area being to be represented in raster format, the second area being to be represented in vector format; and in response to generation of a second image of the object, present the second image of the object, the second image containing an image of the first area represented in the raster format and an image of the second area represented in the vector format, the generation being based on information provided by the first input operation and the second input operation that are accepted, if the first image of the object is represented in the raster format, the processor is configured to generate a third image of the object in the raster format by converting the first image of the object into an image in the vector format and further converting the obtained image in the vector format into an image in the raster format;

segment the first image of the object into the first area and the second area based on a difference between the first image of the object and the third image of the object, and segment the first image of the object into the first area and the second area based on a difference in a feature value as the difference between the first image of the object and the third image of the object.

11. The information processing apparatus according to claim 10, wherein the first input operation and the second input operation are performed by using predetermined application software.

12. A non-transitory computer readable medium storing a program causing a computer to execute a process, the process comprising:

segmenting a first image of an object contained in an image into a first area and a second area in accordance with a property of the first image of the object, the first area being to be represented in raster format, the second area being to be represented in vector format;

converting an image of the second area into an image in the vector format if the first image of the object is represented in the raster format and converting an image of the first area into an image in the raster format if the first image of the object is represented in the vector format; and generating a second image of the object, the second image containing the image of the first area in the raster format and the image of the second area in the vector format, wherein if the first image of the object is represented in the raster format, generating a third image of the object in the raster format by converting the first image of the object into an image in the vector format and further converting the obtained image in the vector format into an image in the raster format; and segment the first image of the object into the first area and the second area based on a difference between the first image of the object and the third image of the object, and segmenting the first image of the object into the first area and the second area based on a difference in a feature value as the difference between the first image of the object and the third image of the object.

* * * * *